(12) United States Patent
Sung

(10) Patent No.: US 8,203,973 B2
(45) Date of Patent: Jun. 19, 2012

(54) METHOD AND SYSTEM FOR PROVIDING A POC BOX SERVICE IN A POC SYSTEM

(75) Inventor: Sang-Kyung Sung, Seoul (KR)

(73) Assignee: Samsung Electronics Co., Ltd (KR)

( * ) Notice: Subject to any disclaimer, the term of this patent is extended or adjusted under 35 U.S.C. 154(b) by 1066 days.

(21) Appl. No.: 11/728,978

(22) Filed: Mar. 27, 2007

(65) Prior Publication Data
US 2007/0238478 A1    Oct. 11, 2007

(30) Foreign Application Priority Data

Mar. 27, 2006   (KR) .................. 10-2006-0027560

(51) Int. Cl.
*H04L 12/16* (2006.01)
(52) U.S. Cl. ........ 370/259; 709/201; 709/219; 709/227; 455/414.1
(58) Field of Classification Search .................. None
See application file for complete search history.

(56) References Cited

U.S. PATENT DOCUMENTS

| | | | |
|---|---|---|---|
| 2003/0223381 A1 | 12/2003 | Schroderus | |
| 2004/0120474 A1 | 6/2004 | Lopponen et al. | |
| 2005/0215273 A1 | 9/2005 | Ito | |
| 2005/0226174 A1* | 10/2005 | Kiss | 370/282 |

FOREIGN PATENT DOCUMENTS

| | | |
|---|---|---|
| JP | 2005-234666 | 9/2005 |
| WO | WO 2005/096658 | 10/2005 |
| WO | WO 2005/101697 | 10/2005 |
| WO | WO 2005/101742 | 10/2005 |
| WO | WO 2006/027407 | 3/2006 |

OTHER PUBLICATIONS

Chen et al. "AD PoC Box" Doc# OMA-POC-POCv2-2005-0061-PoC2 AD-section 8 PoC Box. Dec. 5, 2005. Open Mobile Alliance. pp. 1-9.*
Allen et al. "NW PoC Box Control and Delivery Using Deffered Messaging mechanisms" Doc # OMA-POC-POCv2-2006-0238R01-AD-PoC-Box-Deferred-Messaging.doc. Feb. 24, 2006. Open Mobile Alliance. pp. 1-21.*
Sung et al. "AD 9.x PoC Box Flow in PoC System" Doc # OMA-POC-POCv2-2006-0036R04-AD-9.x-PoC-Box-Flow.doc. Jan. 14, 2006 Open Mobile Alliance, pp. 1-15.*
Sung et al "AD 8.26 PoC Box Service Request" Doc # OMA-POC-POCv2-2006002390AD08.26-PoC-Box-Request.doc. Feb. 27, 2006 Open Mobile Alliance, pp. 1-4.*

(Continued)

*Primary Examiner* — Brian Roberts
(74) *Attorney, Agent, or Firm* — The Farrell Law Firm, P.C.

(57) ABSTRACT

A system and method of a multimedia Push-To-Talk (PTT) over Cellular (PoC) box service is provided which can reflect dynamic requests of a user using a function for interworking with a PoC server and an Extensible Markup Language (XML) Document Management Server (XDMS) in a PoC system. In a method for providing the PoC box service, the PoC XDMS stores various information about a type of media to be stored by a PoC user, a PoC box type, and a connection address after a service request expires. An associated service is implemented by Session Initiation Protocol (SIP) technology between the PoC server and a PoC client and by interworking with the PoC server and the XDMS.

20 Claims, 11 Drawing Sheets

OTHER PUBLICATIONS

Sung et al "AD 9.17.3 PoC Box Flow" Doc # OMA-POC-POCv2-2006-0203-AD-9.17.3-PoC-Box.doc. Feb. 27, 2006 Open Mobile Alliance, pp. 1-4.*

Holm, Jan. "Managing PoC Box" Doc # OMA-POC-POCv2-2006-0132-Managing-Poc-Box. Feb. 27, 2006 Open Mobile Alliance, pp. 1-5.*

Jan Holm, "AD NW PoC Box Function", OMA-AD-PoC-V2_0-20050130, XP55008237, Feb. 15, 2006.

Open Mobile Alliance, OMA-AD_PoC-V2_0-20060314-D, Push to talk over Cellular (PoC)—Architecture, Draft Version 2.0, Mar. 14, 2006.

Open Mobile Alliance, OMA-PAG-GM-AD-V1_0_0-20041111-D, Group Management Architecture, Draft Version 1.0, Nov. 11, 2004.

Sk Sung et al., "AD 8.26 PoC Box Service Request", Open Mobile Alliance, Feb. 27, 2006.

* cited by examiner

```xml
<?xml version="1.0" encoding="UTF-8"?>
  <xs:schema targetNamespace="urn:oma:params:xml:ns:poc:pocbox-settings"
      xmlns="urn:oma:params:xml:ns:poc:pocbox-settings"
      xmlns:xs="http://www.w3.org/2001/XMLSchema"
      elementFormDefault="qualified"
      attributeFormDefault="unqualified">
    <xs:import namespace="http://www.w3.org/XML/1998/namespace"
            schemaLocation="http://www.w3.org/2001/xml.xsd"/>
    <xs:annotation>
      <xs:documentation xml:lang="en">
      XML Schema Definition in support of PoC Box control in the Push-
    to-talk over Cellular (PoC) service.
      </xs:documentation>
    </xs:annotation>

<xs:complexType name="pocbox-control">
      <xs:sequence>
        <xs:element name="Media-type" type="pocboxMediaType"
                minOccurs="0" maxOccurs="unbounded"/>
        <xs:element name="PoCBox-type" type="pocboxType"
                minOccurs="1" />
        <xs:element name="Codec-list" type="codec-type"
                minOccurs="0" maxOccurs="unbounded"/>
        <xs:element name="xml-id" type="xs:string" minOccurs="0"/>
        <xs:element name="max-size" type="xs:string" minOccurs="0"
                maxOccurs="unbounded"/>
        <xs:element name="max-time" type="xs:string" minOccurs="0"
                maxOccurs="unbounded"/>
        <xs:element name="answer-mode" type="pocboxamType"
                minOccurs="0"/>
        <xs:element name="client-unavailable" type="default-pocbox"
                maxOccurs="unbounded"/>
         <xs:any namespace="##other" processContents="lax"
                minOccurs="0" maxOccurs="unbounded"/>
      </xs:sequence>
```

FIG.7A

```xml
        <xs:anyAttribute namespace="##other"/>
      </xs:complexType>
  <xs:simpleType name="pocboxMediaType">
    <xs:restriction base="xs:string">
      <xs:enumeration value="video" />
      <xs:enumeration value="audio" />
    </xs:restriction>
  </xs:simpleType>
  <xs:simpleType name="pocboxType">
    <xs:restriction base="xs:string">
      <xs:enumeration value="NWPoCBox" />
      <xs:enumeration value="UEPoCBox" />
    </xs:restriction>
  </xs:simpleType>
  <xs:simpleType name="codec-type">
    <xs:element name="codecs" type="xs:string" minOccurs="0"
    maxOccurs="unbounded" />
  </xs:simpleType>

<xs:simpleType name="pocboxamType">
    <xs:restriction base="xs:string">
      <xs:enumeration value="automatic" />
      <xs:enumeration value="manual" />
    </xs:restriction>
  </xs:simpleType>
  <xs:simpleType name="default-pocbox">
      <xs:restriction base="xs:string">
        <xs:enumeration value="NWPoCBox" />
    <xs:enumeration value="UEPoCBox" />
    </xs:restriction>
  </xs:simpleType>
</xs:schema>
```

FIG.7B

```
PUBLISH sip   :ccnf _ server @ example . domain . com SIP /2.0
Via : SIP /2.0/ UDP client  _pc. domain .com ; branch =z9 hG 4 bK 776 sgdkse
From :< sip : client _ a @ domain . com >; tag = 49583
To :< sip :conf _ server @ example . domain .com >
Call -ID : asd 88 asd 77 a @ client _ apc . domain . com
CSeq : 78 PUBLISH
Max - Forwards  : 70
Event : poc - settings
Accept - Contact : *;+g. poc . talkburst ; require ; explicit
Content -Type : application /poc - settings + xml
Content -Length :< appropriate value  >

<? xml version ="1.0 " encoding =" UTF -8"?>
< poc - settings
   xmlns    =" urn : oma : params : xml :ns : poc :poc - settings "
   xmlns    :xsi =" http ://www .w3. org / 2001 / XMLSchema   -instance "
   xsi : schemaLocation    =" urn : oma : params : xml :ns : poc :poc - settings ">

< am - settings >
     < answer -mode > automatic </ answer -mode >
  < / am - settings >
  <' note > PoC Box service parameter     </ note  >
  < pocbox - setting >
      < PBX active  =" true ">
         < PBX_TYPE = " NW PoC Box " >
  < / pocbox - setting >
</ poc - settings >
```

FIG.8

```xml
<?xml version="1.0" encoding="UTF-8"?>
  <xs:schema targetNamespace="urn:oma:params:xml:ns:poc:pocbox-settings"
      xmlns="urn:oma:params:xml:ns:poc:pocbox-settings"
      xmlns:xs="http://www.w3.org/2001/XMLSchema"
      elementFormDefault="qualified"
      attributeFormDefault="unqualified">

<xs:import namespace="http://www.w3.org/XML/1998/namespace"
            schemaLocation="http://www.w3.org/2001/xml.xsd"/>
    <xs:annotation>
      <xs:documentation xml:lang="en">
        XML Schema Definition in support of PoC Box control in the Push-to-talk over Cellular (PoC) service.
      </xs:documentation>
    </xs:annotation>

<xs:element name="poc-settings" type="poc-settingsType"/>
    <xs:complexType name="poc-settingsType">
      <xs:sequence>
        <xs:element name="pocbox-settings" type="pocboxSettingType"
              minOccurs="0" maxOccurs="unbounded"/>
        <xs:any namespace="##other" processContents="lax"
              minOccurs="0" maxOccurs="unbounded"/>
      </xs:sequence>
      <xs:anyAttribute namespace="##other"/>
    </xs:complexType>

<xs:complexType name="pocboxSettingType">
      <xs:sequence>
        <xs:element name="PBX">
          <xs:complexType>
            <xs:attribute name="active" type="xs:boolean"
                    user="required" />
          </xs:complexType>
        </xs:element>
```

FIG.9A

```
<xs:element name=  "PBX-TYPE">
    <xs:simpleType>
        <xs:restriction base="xs:string">
            <xs:enumeration value="NWPoCBox"/>
            <xs:enumeration value="UEPoCBox"/>
        </xs:restriction>
    </xs:simpleType>
</xs:element>
<xs:any namespace="##other" processContents="lax"
        minOccurs="0" maxOccurs="unbounded"/>
</xs:sequence>
<xs:anyAttribute namespace="##other"/>
</xs:complexType>
</xs:schema>
```

FIG.9B

METHOD AND SYSTEM FOR PROVIDING A POC BOX SERVICE IN A POC SYSTEM

PRIORITY

This application claims priority under 35 U.S.C. §119 to an application entitled "Method and System for Providing a PoC Box Service in a PoC System" filed in the Korean Intellectual Property Office on Mar. 27, 2006 and assigned Serial No. 2006-27560, the contents of which are incorporated herein by reference.

BACKGROUND OF THE INVENTION

1. Field of the Invention

The present invention relates generally to a method and system for managing a Push-To-Talk (PTT) over Cellular (PoC) box in a PoC system, and more particularly to a PoC box management method and system in which a PoC User Equipment (UE) stores in advance PoC box service parameters in a special server and a PoC box stores PoC media based on PoC box service parameter information of an associated PoC UE according to a session request in a multimedia PoC system.

2. Description of the Related Art

With the significant development of mobile communications and the broad extension of the communication network, various extended services and applications using mobile phones are being provided. According to various user requests, services beyond a simple call service is being such as positioning, multimedia and Push-To-Talk (PTT) services, are being provided. Specifically, the PTT service supports various additional functions such as instant messenger and state display, as well as a group call and a voice call that are possible in a conventional radio system or a Trunked Radio System (TRS).

A concept of this PTT service is being actively discussed to standardize a PTT over Cellular (PoC) service using a mobile communication network. One characteristic of the PoC service different from the conventional mobile communication service is that users can perform communication while moving between multiple sessions according to need. The requirement that users should be able to perform communication while moving between multiple sessions is prescribed in the standard of the Open Mobile Alliance (OMA) serving as an organization for developing a standard for a mobile communication service.

As defined in the PoC 1.0 standard, media data is sent only to PoC clients participating in a PoC session in real time. Thus, users who do not participate in the PoC session due to reasons such as battery discharge and absence, cannot receive a media stream such as voice in a 1-1 or group PoC session. That is, the PoC 1.0 technology does not support a function of a voice mailbox supported in the conventional Circuit Switched (CS) communication.

To address the problem when a PoC UE does not participate in the session and cannot receive a media stream, OMA PoC Release 2 considers a PoC box for which the function is similar to that of a Multi Media (MM) box for a conventional Multi Media Service (MMS). In a PoC box service, a PoC client incapable of participating in a 1-1 or group PoC session in real time participates in the associated PoC session using a particular physical or logical storage system. As described above, the PoC box stores media sent in the session when the PoC client participates in the associated PoC session. Subsequently, the stored media are provided and reproduced according to the PoC user's request.

A conventional method employs a Session Initiation Protocol (SIP) PUBLISH message to implement a PoC box service, in which, a PoC box service request is sent to a PoC server using the SIP PUBLISH method. When the request is made, a type of media to be stored in the PoC box is directly contained in an SIP request message to be transmitted to the PoC server. This technology requires an extension of an Extensible Markup Language (XML) schema format for defining PoC service setting values in the PoC 1.0 standard, an XML document is directly stored in the PoC server. An XML document can be dynamically accessed, edited, and modified independent of an SIP message. Because multiple PoC service setting values are stored when PoC box service related data is directly stored in the PoC server, the load of the PoC server can increase and various XML documents relating to the PoC service cannot be managed in an integrated manner.

SUMMARY OF THE INVENTION

It is, therefore, an object of the present invention to provide a method and system that can implement an improved PoC box service capable of satisfying a user request by interworking with a PoC server and an XML document management server for storing PoC box service parameters.

It is an object of the present invention to provide a method and system that can reduce a signaling burden on a PoC server covering a wireless zone and can efficiently manage a related XML document by separately performing an operation for maintaining and managing PoC box service parameters and an operation for sending a PoC box service request from a PoC client.

It is an object of the present invention to provide a method and system that can reduce a signaling burden on a PoC server for managing a PoC session by storing PoC box service parameters, reading the PoC box service parameters stored in a server when a session request for an associated PoC client is present, and implementing a PoC box service.

In accordance with the present invention, there is provided a method for providing a PoC box service interworking with an XML Document Management Server (XDMS) in a PoC system, including setting a PoC box rule document when the PoC box service is used between the XDMS and an XML Document Management Client (XDMC) of a PoC UE, activating the PoC box service from a PoC client of the UE, receiving PoC box service information for the PoC client from the XDMS after requesting the PoC box service information when a PoC server receives a new session INVITE message, and routing a session request message and managing a media transmission according to the PoC box service information.

In accordance with another aspect of the present invention, there is provided a system including a PoC UE for setting and managing a rule document relating to a PoC box service in an XDMS and sending an SIP signal request for activating the PoC box service; an XDMS for providing the rule document relating to the PoC box service while interworking with a PoC server after receiving and storing an XML document from an XDMC, and the PoC server for performing routing to a proper PoC box and media transmission control according to an associated XML document when receiving a PoC box service activation message from the PoC client and receiving a session request message from a different network.

The step of setting the rule document relating to the PoC box service between the XDMC of the PoC UE and the XDMS including generating information about a type of a PoC box to be used in the UE or a network when the PoC box service is initiated, a type of media to be transmitted to the PoC box, an allowable maximum size and time when the media are stored, an answer mode of the PoC box, identification of an XML document stored in the XDMS, a codec to be used when the media are stored in the network PoC box, and a PoC box service parameter to be used when the PoC box service activation message has expired in addition to dynamic information.

In the present invention, a process for sending the PoC box service activation message from the PoC client can be omitted. After receiving the session request message for the PoC client, the PoC server can apply a PoC box rule document by automatically subscribing to an XML document. A process in which the PoC server receives the rule document relating to the PoC box service from the XDMS can be performed immediately after the PoC box service activation message is sent, regardless of whether the session request message is received. Thus, the above-described process is applied only when the PoC client sends a PoC box service activation message of a request to the PoC server.

In the present invention, the XDMS can be located in the conventional PoC XDMS and in a shared rule XDMS defined independently.

BRIEF DESCRIPTION OF THE DRAWINGS

The above and other objects, features, and advantages of the present invention will be more clearly understood from the following detailed description taken in conjunction with the accompanying drawings, in which:

FIGS. 7A and 7B illustrate examples of an XML document schema contained in a Hyper Text Transfer Protocol (HTTP) PUT message that is sent from an XDMC to the XDMS in FIG. 5;

FIG. 8 illustrates an example of an SIP PUBLISH message sent from the PoC client to the PoC server for a PoC box service in FIG. 6; and FIGS. 9A and 9B illustrate examples of an extended XML schema for implementing extended PoC service settings using an SIP PUBLISH message in accordance with the present invention.

DETAILED DESCRIPTION OF THE PREFERRED EMBODIMENTS

The present invention provides a method and system in which a PoC server can efficiently provide a PoC box service by interworking with a PoC XDMS or shared XDMS when the PoC box service is provided in an OMA PoC system.

In detail, the present invention provides a method for allowing a PoC user to store PoC box service parameter information in the XDMS through an XDMC provided in a UE and a PoC media storage method for reflecting a PoC box service request between a PoC client and a PoC server and reflecting a user request through interworking between the XDMS and the PoC server.

Preferred embodiments of the present invention will be described in detail herein below with reference to the accompanying drawings. In the following, there will be described an example in which the present invention is applied to a PoC system for a PTT service using a cellular mobile communication network among PTT systems. Conventionally, the PoC system exploits an SIP and an SIP extension protocol in order to deliver session participation information of a group call and exploits an XML Configuration Access Protocol (XCAP) for acquiring group information. In particular, the present invention employs the XCAP such that the XDMC of the PoC UE stores PoC box service parameters in the XDMS.

Functions of the present invention as described below can be implemented by the above-described protocols. A basic structure of the present invention can exploit a PoC Release 1 system.

Figure 1:
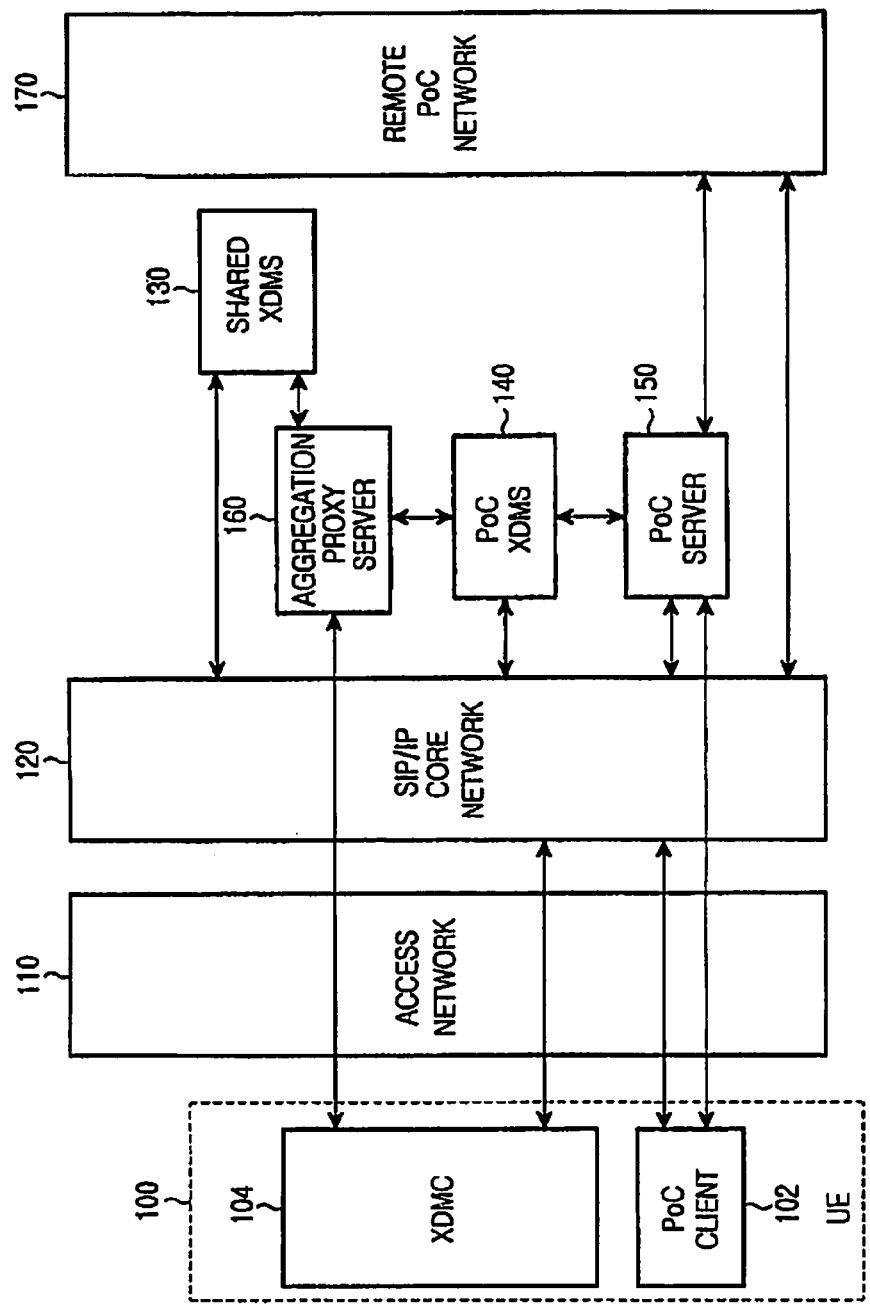
FIG. 1 illustrates a structure of a conventional PTT, PoC service system.

FIG. 1 is a diagram illustrating a conventional PoC service system and an associated network structure. In FIG. 1, the conventional PoC system is configured with a PoC UE 100, XDMSs 130 and 140 and a PoC server 150. The PoC system further includes an aggregation proxy server 160. These components are connected through an access network 110, an SIP/Internet Protocol (IP) core network 120 and a remote PoC network 170.

The PoC UE 100 includes a PoC client 102 and an XDMC 104. The PoC client 102 is a service requester embedded in the PoC UE 100 and accesses a network for providing a PoC service to a PoC service subscriber while residing in the PoC UE 100. The PoC service subscriber receives the PoC service through the PoC UE in which the PoC client is embedded. Hereinafter, the term "PoC client" is used as the general term for the UE in which the PoC client is embedded and the PoC service subscriber. A reference numeral denoting the PoC client will be omitted, except for when it should be specially distinguished.

The PoC client establishes a PoC session for the PoC service subscriber, i.e., the PoC client, participates in and ends an established session. Also, the PoC client creates and transfers a talk burst, supports instant personal alert, and authenticates function at the time of a connection to the PoC server. The PoC client can be connected to the SIP/IP core network 120 serving as the core network for supporting SIP/IP multimedia through the access network 110.

The SIP/IP core network 120 is connected to the PoC server 150, and the XDMSs 130 and 140 to support the PoC service. The PoC server 150 performs a controlling PoC function for maintaining and managing the PoC session or a participating PoC function for participating in the PoC session opened for one-to-one or multiparty communication.

The PoC service can be accompanied with a service for opening a group session as in a conference call. For this, the OMA standard defines the XDMC 104 and the XDMSs 130 and 140 for a group list service. The PoC XDMS 140 is used for the PoC service and the shared XDMS 130 is commonly available in other service enablers. Information about a group or group members is stored in the XDMSs 130 and 140 through the PoC client. The PoC client 102 can learn information of PoC clients capable of being called thereby through an individual or group list sent from the XDMSs 130 and 140. Group and group member information stored in the XDMSs 130 and 140 can be generated, corrected, and managed through communication networks such as the Internet and a reliable Intranet. Because an XML-document management protocol for generating, correcting, and deleting a group list and its concrete contents is not directly related to the present invention, a detailed description thereof is omitted herein.

When an aggregation proxy server 160 receives a group list-related request from the XDMC 104 for a group service, the received request is routed to the XDMSs 130 and 140 according to proper rule.

Figure 2:
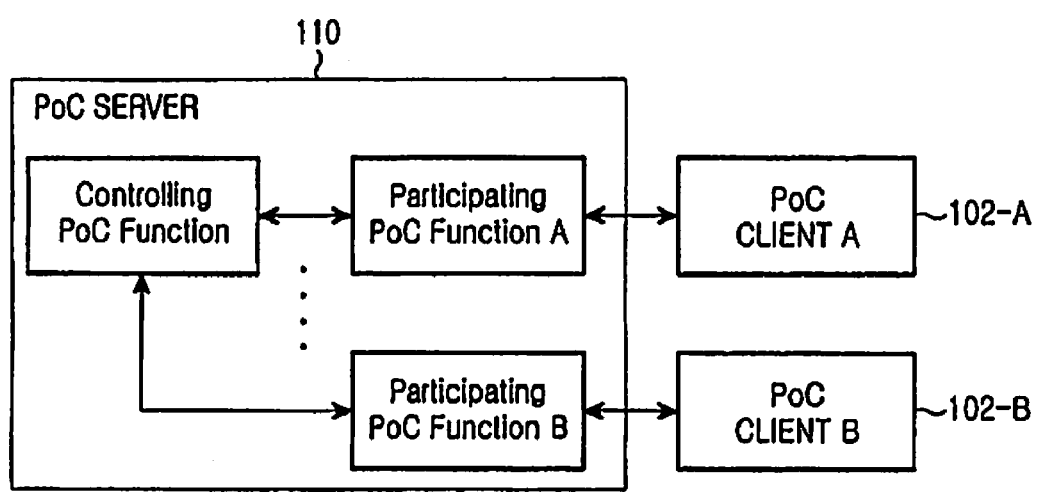
FIG. 2 illustrates a structure of a conventional PoC server.

FIG. 2 illustrates a conventional PoC server. Functions of the PoC server are divided into a controlling PoC function (CF) for maintaining and managing the overall PoC session and a participating PoC function (PF) responsible for maintenance and management between sessions. Function-by-function characteristics of the PoC server will be described with reference to Table 1 and Table 2.

TABLE 1

Controlling PoC Function (CF)

Provides centralized PoC session handling
Provides the centralized Media distribution
Provides the centralized Talk Burst Arbitration functionality including talker identification
Provides SIP session handling, such as SIP session origination and termination
Provides policy enforcement for participation in group sessions
Provides the participants information
Collects and provides centralized media quality information
Provides centralized charging reports
May Provide transcoding between different codecs
Supports Talk Burst Control Protocol Negotiation As shown in Table 1, the CF serves to manage the PoC sessions on the whole, particularly to receive, sequence and authorize the right-to-speak (or floor) requests of the PoC clients, to distribute a talk burst requested by an arbitrary PoC client to all the other PoC clients participating in group calling and to provide information of the PoC clients participating in the group calling.

As shown in Table 2 below, the PF serves to manage the sessions that are linked with the CF and the respective PoC clients in the PoC session. In particular, the PF serves to relay the right-to-speak when requested by the PoC client when assigned to the PoC client in the CF. Moreover, the PF serves to relay media between the CF and the PoC client, to perform transcoding when different codecs are used between the CF and the PoC client, and to filter any one of two simultaneous sessions in response to the PoC client's selection when the PoC client simultaneously participates in more than one session.

TABLE 2

Participating PoC Function (PF)

Figure 3:
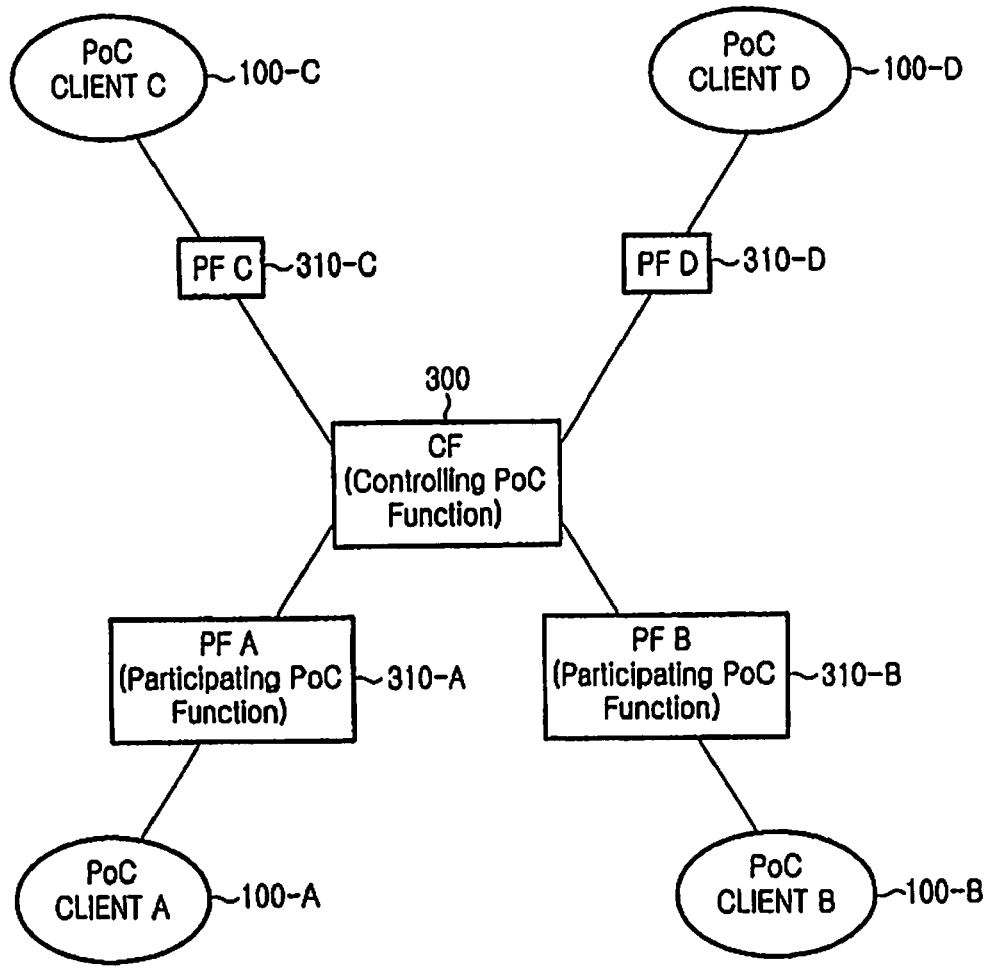
FIG. 3 illustrates a controlling PoC function block and a participating PoC function block of a conventional PoC server.

Provides PoC session handling
May provide the Media relay function between PoC Client and Controlling PoC server
May provide user media adaptation procedures
May provide the Talk Burst control message relay function PoC Client and Controlling PoC server
Provides SIP session handling, such as SIP session origination and termination on behalf of the represented PoC Client
Provides policy enforcement for incoming PoC session (e.g., access control, incoming PoC session barring and availability status)
May collect and provide media quality information
Provides the participant charging reports
May provide filtering of the media streams in the case of simultaneous sessions
May provide transcoding between different codecs
May support Talk Burst Control Protocol Negotiation
Stores the current Answer Mode and Incoming PoC Session Barring preferences of the PoC Client FIG. 3 illustrates CF and PF blocks of the conventional PoC server.

Referring to FIG. 3, PoC clients 100-A to 100-D access a CF 300 through PFs 310-A to 310-D to set up a PoC session. Media are provided to the respective PoC clients having the floor assigned by the CF 300. The PoC client having the floor can speak after identifying information of the PoC clients participating in a group session.

The call processing technology for a call connection in the PoC system can perform various procedures according to requests and situations of transmitting and receiving sides. Characteristics of the PoC system required by the OMA according to settings of the transmitting and receiving sides are as follows.

First, the receiving side sets its own answer mode according to the PoC client's request. The answer mode is divided into automatic answer mode and manual answer mode. In the automatic answer mode, a receiver immediately sends the answer from an associated network to the transmitting side instead of the manual answer when an associated PoC client is included in a PoC client list designated by the receiving side. The network automatically send the answer in place of the UE because the PoC server has a function for performing the answer mode and storing an associated user list according to an answer-mode setting request of the UE. The manual answer mode operates when an associated user is unclear or is not included in a user list relative to the automatic answer mode, or when the receiver sets the manual answer mode for all users. A PoC call request is sent to the user's UE through a receiving network and a call connection is established by permission of the PoC client.

Second, the PoC system classifies session modes into on-demand and pre-established session mode according to connection setup with the PoC server within a home network of a user. The pre-established session mode is for pre-establishing a session between the PoC client and the PoC server belonging to the home network thereof in response to the PoC client's request. This pre-established session is necessary to quickly open a session when the PoC client pre-negotiates media parameters to be later used with the PoC server without re-negotiating the media parameters with the PoC server.

For the pre-established session, the PoC client provides supportable media parameters to a body, i.e., a Session Description Protocol Multipurpose Internet Mail Extensions (SDP MIME) body, in an SIP INVITE method, provides media parameters received from the server, and responds to the media parameters received from the server. A response message from the server includes identification information of a newly pre-established session and a conference Uniform Resource Identifier (URI) and is returned to the PoC client.

When the above-described pre-established session is used, pre-negotiation can be performed for such parameters as an IP address, a port number, a codec to be used, a media type, and a talk burst control protocol. The on-demand session mode indicates a state in which PoC clients do not set up a pre-established session. In the on-demand session mode, a PoC call connection procedure is performed after receiving an INVITE message from a PoC client.

The answer mode set for a call request in the PoC system can be stored in both the PoC server serving as the network element and the PoC client serving as the user's UE.

When the answer mode is set in the home network for managing the PoC client, it is implemented in the PoC server for performing the PF within the home network to which the PoC client belongs.

When the answer mode is set in the network, the PF immediately and automatically sends a response of a session progress message to a call request network when a PoC call request is received from a different PoC server. Thus, if the automatic answer mode is set, it has a simpler call request procedure in comparison with when a response is made after a session setup message is transferred to the PoC client. Thus, an initial floor assignment time is reduced.

Because a result different from the user's response intention can occur according to when the automatic answer is made in the network, the answer mode can also be set in the PoC client. At this time, a priority of the answer mode of the PoC client is higher than that of the answer mode set in the network. This is to address a privacy problem when the answer mode is not reflected in real time due to a signal delay or error in the network if the PoC client changes its own answer mode and sends an answer mode update request to the PoC server.

The PoC service can set the answer mode of the user in both the PoC server and client. The answer mode is decided by the PoC client considering the most recent intention of the user. According to this decision, a media stream (of actual voice or video of the user) can be transferred.

A PoC multimedia session opening procedure in the PoC system with the above-described characteristics will now be described.

The PoC client at the transmitting side sends a multimedia INVITE message using the SIP and makes a request for processing a call. Herein, multimedia can include various formats of audio, video and text according to media types. In response to the request for processing a call, the PoC client at the receiving side follows various response procedures according to a pre-established session and answer mode setting in an associated PoC server. A call processing procedure for a PoC call will be described using a procedure for when the PoC clients at the transmitting and receiving sides are located in the same network.

The PoC client at the transmitting side sends, to an associated SIP/IP core network, an SIP INVITE request including SIP address information of the PoC client at the receiving side. At this time, the SIP INVITE message can further include elements of PoC address information of the PoC client at the transmitting side, required media parameters, and characteristic value information indicating the PoC service. Herein, the "requested media parameters" can include a plurality of characteristic values indicative of an audio and video encoding method, rate, payload type, and so on when a requested session is a multimedia session.

The SIP INVITE message is transferred to a participating PoC server through an IP Multimedia Subsystem (IMS) server within an IMS network, i.e., a Proxy-Call Session Control Function (P-CSCF) and Serving-Call Session Control Function (S-CSCF), using a path query in a Dynamic Host Configuration Protocol (DHCP) server or Domain Name Server (DNS). When a general call request is made, the participating PoC server connected to the PoC client can be implemented separately from the controlling PoC server for managing a talk burst of an opened session. The SIP INVITE request sent to the PF entity is transferred to the CF entity of the controlling PoC server through the associated SIP/IP core network.

A PoC session control network with the CF receives a response message from a network at the receiving side after transferring an SIP INVITE request message to the network at the receiving side. The SIP response message from the network at the receiving side can be a provisional response message of 1xx, a successful response message of 2xx, or an error response message of 4xx ~6xx according to setting of the PF and the PoC client at the receiving side. In the automatic answer mode, an SIP 183 "session progress" signal is received as a response message, through which a connection between the PoC server and client can be established in the IMS network of a call requester. A call acknowledgment signal of the PoC client at the receiving side is returned as an SIP 183 "session progress" signal or an SIP 200 "OK" response, and is transferred to the PoC client through the PoC server of the CF and PF. When receiving the SIP 200 "OK" response or the SIP 183 "session progress" signal from the PoC server at the receiving side, the CF entity determines that a PoC call has been connected and sends a floor granted signal for assigning the floor for a talk burst to the PoC client at the transmitting side. The response of the SIP 200 "OK" or 183 "session progress" signal is classified as a "confirmed" or "unconfirmed" response. The CF entity requires a buffering function when the "unconfirmed" response is received.

The PoC client at the transmitting side receives a talk burst transmission granted signal, for example, a floor granted signal for transferring call connection sound, through a Real Time Control Protocol (RTCP) after receiving the response signal to the SIP INVITE request signal. The floor granted signal is generated from the CF entity having the right to arbitrate a talk burst and is sent to the PoC client through the PF entity for managing an associated PoC client. Because the floor granted signal uses a bearer path without the SIP, it can be sent without passing through the SIP/IP core network such as the IMS. When identifying the call connection sound, the PoC client sends media, such as a voice stream, using a Real-time Transport Protocol (RTP).

A structure of a system for managing a PoC box in the PoC system configured as described above will be described with reference to FIG. 4.

Figure 4:
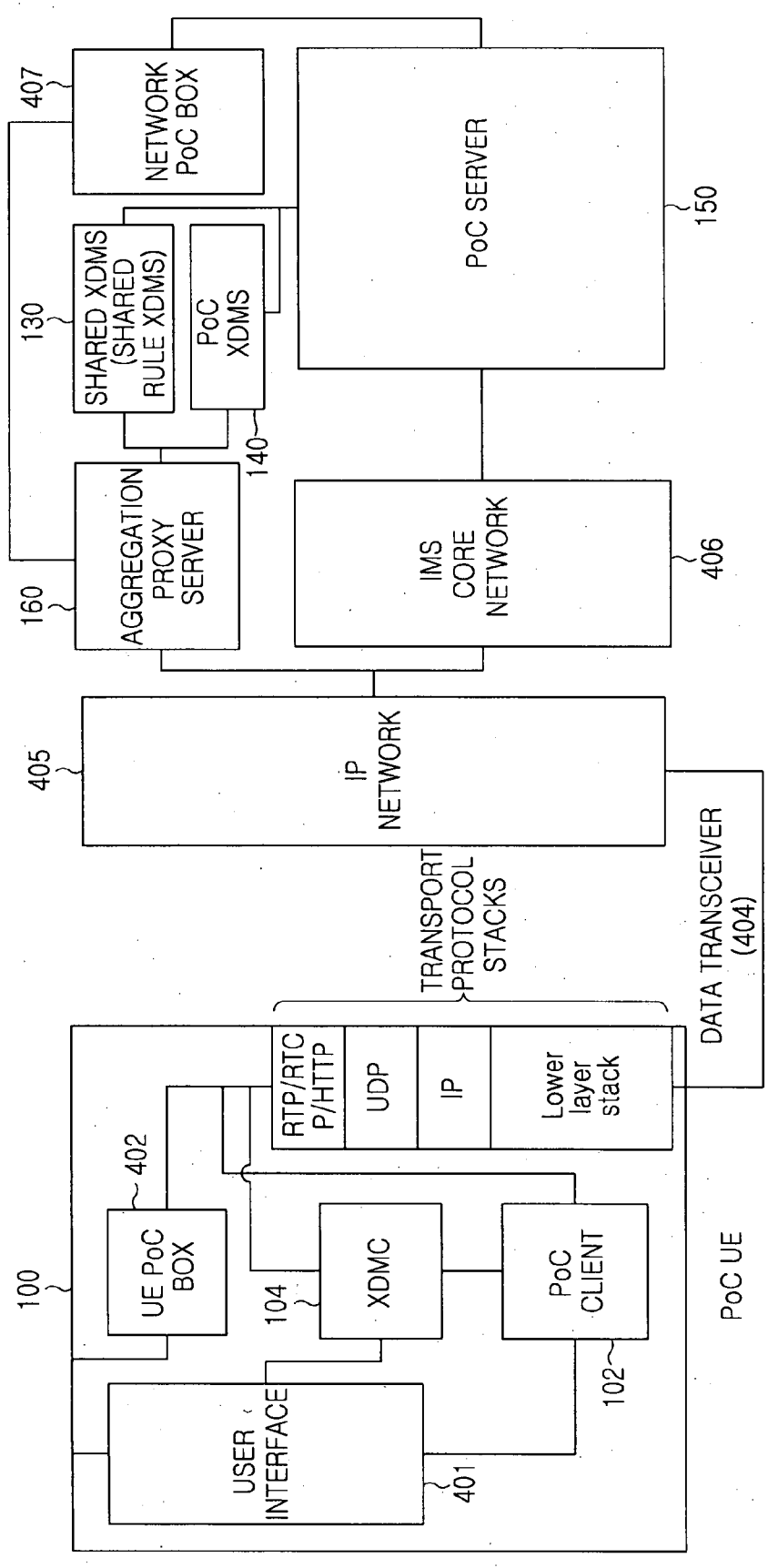
FIG. 4 is a block diagram illustrating a PoC system including a PoC, UE and a PoC box in accordance with the present invention.

Referring to FIG. 4, the system for implementing a PoC box service includes a PoC UE 100, an XDMS 130, a PoC server 150 and PoC boxes 402 and 407 for storing media. The PoC box can be the UE PoC box 402 within the PoC UE 100 and can be the network PoC box 407 on the network.

In detail, the PoC UE 100 can be configured with a PoC client 102 for processing the SIP used to open and control a PoC session, an XDMC 104 for managing an XML document used for the PoC box service, and the PoC box 402 having a storage function within the PoC UE 100. A user interface 401 transfers the user's input to the PoC UE 100. A data transceiver 404 can include transport protocol stacks for transmitting and receiving packet data. The data transceiver 404 can include an RTP/RTCP/HTTP stack, User Datagram Protocol (UDP) stack, IP stack and lower layer stack.

In the present invention, the XDMC 104 generates an XML rule document containing service parameters for the PoC box service input through the user interface 401 and transmits the generated XML document to the XDMS 130 through the aggregation proxy server 160. The XDMS 130 acts as a server for storing PoC box service information.

Further, when an input for activating the PoC box service through the user interface 401 is present, the PoC client 102 sends an SIP PUBLISH message corresponding to a request message for activating the PoC box service to the PoC server 150. When the PoC box service is provided, a document containing PoC box service control parameters stored in the XDMS 130 is applied.

An operation between components for storing PoC box service parameter information in the XDMS 130 through the XDMC 104 provided in the UE of the system for providing the PoC box service as illustrated in FIG. 4 will be described in detail with reference to FIG. 5. Further, an operation for storing media in an associated PoC box in response to a PoC box service request between the PoC client 102 and the PoC server 150 and a PoC box service request set by the user through interworking between the XDMS 130 and the PoC server according to a session request will be described with reference to FIG. 6.

Figure 5:
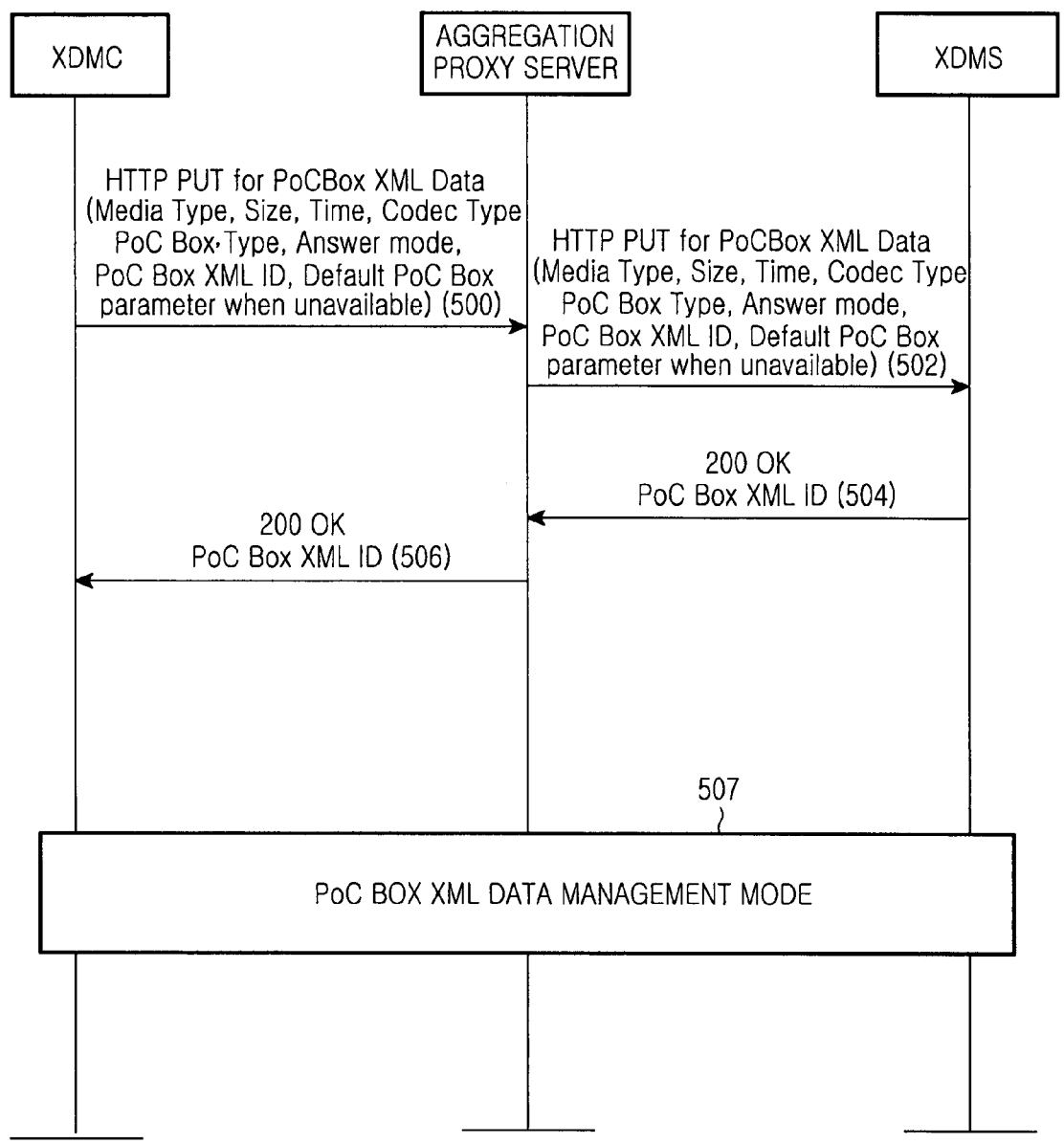
FIG. 5 is a flow diagram illustrating signals transmitted and received between the PoC UE and an XML, XDMS for providing a PoC box service in accordance with the present invention.

FIG. 5 is a flow diagram illustrating signals transmitted and received between the PoC UE and the XDMS to provide a PoC box service in accordance with the present invention.

Referring to FIG. 5, the XDMC 104 within the PoC UE 100 generates PoC box service parameters input through the user interface 401. The PoC box service parameters can include such parameters as a PoC box type for indicating the use of the UE PoC box or the network PoC box, a type of media to be transmitted to the PoC box, a maximum storage size and time, a type of codec to be used when media are stored in the PoC box, an answer mode of the PoC box and a PoC box ID. When a PoC box service activation request message has expired in the PoC server 150, information about the PoC box service to be used can be added. Herein, the PoC box ID can be independently generated and included in the XDMC 104. Alternatively, this parameter may be generated from the XDMS and may be transmitted to the PoC UE 100.

The XDMC 104 generates PoC box service parameters for PoC box service information input by the user and sends a request message for setting the PoC box service information including the generated PoC box service parameters in steps 500 and 502. The request message for setting the PoC box service information can be implemented with an HTTP PUT message, and can contain URI information. Further, the HTTP PUT message can be sent to the XDMS using the XCAP, which can easily access and edit an XML document. The generated PoC box service parameters are transmitted to the aggregation proxy server 160 using the HTTP PUT message. Because the aggregation proxy server 160 authenticates, compresses, and routes the message, it forwards the received HTTP PUT message to the XDMS corresponding to a destination of an associated XML document. The HTTP PUT message is transmitted and includes the PoC box service parameters and ID information of an XML document of a PoC box service rule.

When receiving the HTTP PUT message, the XDMS stores the PoC box service parameters contained in the received message. The XDMS sends a response message to the XDMC 104 corresponding to a sender of the HTTP PUT message through the aggregation proxy server 160 in steps 504 and 506. When receiving the message containing the PoC box ID in the PoC box service parameters, the XDMS verifies whether the ID is available. If the ID is available, the XDMS sets the ID received from the XDMC 104 and includes and transmits the set ID in the response message. However, when the PoC box ID is not included in the HTTP PUT message received by the XDMS, a PoC box service ID is generated and mapped to the PoC box service parameters. The XDMS includes the PoC box service ID in the response message and sends the response message to the XDMC through the aggregation proxy server 160 in steps 504 and 506.

The present invention defines conditions to be used when a PoC box service is provided by transmitting and receiving a message containing PoC box service parameters mapped to session initiation conditions of the PoC box service between the XDMS and the XDMC 104 of the PoC UE 100 and a PoC box service ID for identifying the set PoC box service parameters.

When the XDMS stores the PoC box service parameters and the PoC box service ID for identifying the set PoC box service parameters in steps 500 to 506, the XDMS proceeds to step 507 to set PoC box XML document management mode, which is used to manage the stored PoC box service parameters. For example, when an input for modifying or deleting the PoC box service parameters is present, the XDMC 104 sends the PoC box service ID information and parameter information to be modified or deleted to the XDMS using the XCAP for data management for modifying or deleting an associated XML document stored in the XDMS, such that the information can be updated.

Figure 6:
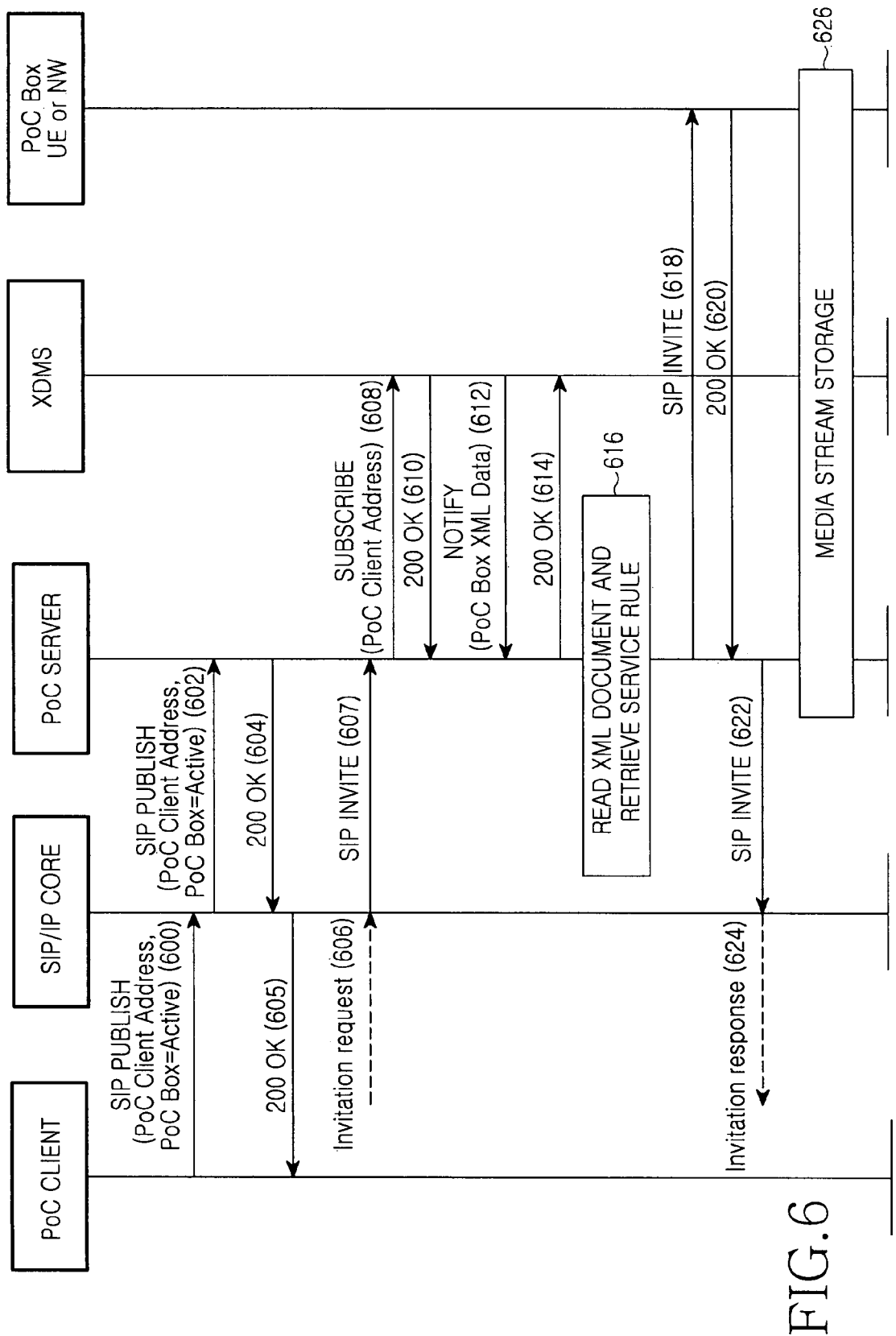
FIG. 6 is a flow diagram illustrating a process for managing a PoC box using a PoC box service Identifier (ID) in a PoC client in accordance with the present invention.

FIG. 6 is a flow diagram illustrating a process in which the PoC client activates the PoC box service and the PoC server provides the PoC box service according to preset PoC box service data in accordance with the present invention.

When receiving a PoC box service request from the user, the PoC client 102 sends a request message for activating the PoC box service to the PoC server 150 via the SIP/IP core network in steps 600 and 602. The message for requesting the PoC box service can use an SIP PUBLISH message, which contains an additional PoC box service field as well as a field for indicating a PoC service setting value defined in the PoC 1.0 technology. In the present invention, the PoC box service field can include a value indicating whether the PoC box service is activated. The request message for activating the PoC box service can contain address information of the PoC UE 100 and an additional PoC box service data ID.

When receiving the PoC box service request message, the PoC server 150 activates the associated PoC box service and sends a 200 OK response message to the PoC client 102 in steps 604 and 605.

When receiving a session request message from the PoC client for which the PoC box service is activated in steps 606 and 607, the PoC server 150 sends, to the XDMS, a message for requesting PoC box service parameter information in order to request a stored XML document mapped to the associated PoC box service in step 608. The PoC server 150 can include PoC UE address information or a PoC box service data ID in the message for requesting the PoC service parameter information to be sent to the XDMS.

When receiving the message for requesting the PoC service parameter information, the XDMS sends a 200 OK response message to the PoC server 150 in step 610. Further, the XDMS sends, to the PoC server 150, a NOTIFY message containing the stored XML document mapped to the PoC box service data ID or PoC UE address information contained in the message for requesting the PoC box service information in step 612.

When it receives the XML document for an associated PoC client, the PoC server 150 reads the XML document and retrieves a service rule from the PoC service parameter information in step 616.

The PoC server 150 sends, in step 618, a session request message (or SIP INVITE message) to the PoC box set by the PoC client receiving a session request according to the service rule retrieved in step 616. For example, when the PoC box type is set to the UE PoC box in the XML document, the PoC server 150 routes the session request message to the UE PoC box 402.

When receiving the session request message, the PoC box conventionally sends, in step 620, an automatic response message (200OK) to the PoC server 150. The PoC server 150 sends a response message to the PoC client requesting a session in steps 622 and 624, such that a session connection process is performed. In step 626, an operation for storing a media stream is performed. When receiving media to be transmitted to the PoC box after the session connection, the PoC server 150 can transmit only media of a requested type according to the service rule retrieved in step 616.

After performing the PoC box service request process in steps 600 to 605 of FIG. 6, the PoC server 150 requests and receives an XML document relating to the PoC box service and provides the PoC box service when a session request is present for the PoC client in which the PoC box service is activated. Because the PoC server 150 can store only a PoC box related XML document of the PoC client contained in a session request message, the server load decreases. In another method, a process for requesting and receiving the XML document relating to the PoC box service can be performed after the PoC box service request process.

It is noted that the PoC box service request process in steps 600 to 605 of FIG. 6 can be omitted. When the PoC box service request process is omitted, the PoC server 150 performs a process for collecting a PoC box service related document from the XDMS in steps 608 to 614 after receiving the session INVITE message for the associated PoC client. The PoC server processes an SIP call and a media transmission according to PoC box related service parameters defined in the collected document.

FIGS. 7A and 7B illustrate examples of an XML document schema contained in an HTTP PUT message that is sent from an XDMC to an XDMS in FIG. 5. The XML document formats defined in FIGS. 7A and 7B include content capable of being contained in an HTTP PUT message that is sent from the XDMC to the XDMS.

Referring to FIG. 7A, elements defined in the document include PoC box service parameters, i.e., a PoC box media type (Media-type), a PoC box type (PoCBox-type), a type of codec (codec-type) to be used in the PoC box, a maximum storage size and time (max-size and max-time), an answer mode (answer-mode) of the PoC box, and reference information (client-unavailable) to be used when PoC box activation has expired. The "client-unavailable" information includes a value for indicating whether the PoC box is used when the PoC box activation has expired. According to this value, a PoC box service function can be provided even when the PoC UE is powered off.

As illustrated in FIG. 7B, reference information to be used when the PoC box activation has expired includes a media type, a type of codec to be used in the PoC box, an answer mode of the PoC box, and information indicating whether the PoC box is used when the PoC box activation has expired. In FIG. 7B, the answer mode of the PoC box is set to automatic answer mode (pocboxamType), and the information indicating whether the PoC box is used when the PoC box activation has expired is set to "default-pocbox".

First, FIG. 8 illustrates content of an SIP PUBLISH message sent from the PoC client to the PoC server in FIG. 6. The SIP PUBLISH message contains a "pocbox-setting" element by extending a PoC service setting value defined in the conventional PoC1 standard, such that the PoC box service activation can be set. A "PBX active" value corresponding to a sub-element of the "pocbox-setting" element is set to a "true" or "false" value, such that a PoC box service activation or deactivation request can be identified. Alternatively, a PoC box type can be identified when a "PBX_TYPE" value of parameters set in the XDMS is set to "NW PoC box" or "UE PoC box". The information about the PoC box type can be included in string text.

FIGS. 9A and 9B illustrate definitions of extended XML schemas for implementing extended PoC service settings using the SIP PUBLISH message. In addition to a schema of the conventional PoC service setting, "PBX" and "PBX-type" elements are defined and are expressed by a binary value and a string text value, respectively.

When the conditions for opening a session are satisfied, the present invention divides a PoC box service method in which a session is initiated by a network into a PoC box service parameter setting procedure and a service request procedure, thereby reducing a signaling burden on a PoC server for managing a PoC session. Further, the present invention dynamically manages a related XML document by freely generating, modifying or deleting PoC box service parameters, and provides a PoC box service function even when a PoC UE is powered off.

Although the preferred embodiments of the present invention have been disclosed for illustrative purposes, those skilled in the art will appreciate that various modifications, additions, and substitutions are possible, without departing from the scope of the present invention. Therefore, other possible embodiments and modifications without departing from the principle of the present invention may fall into the protected scope of the present invention

What is claimed is:

1. A method for managing a Push-To-Talk (PTT) over Cellular (PoC) box service in a PoC User Equipment (UE) in a PoC system, wherein the PoC system comprises the PoC UE including a PoC Extensible Markup Language (XML) Document Management Client (XDMC) and a PoC client, a PoC server, a PoC box service information storage server for storing PoC box service information, and a PoC box, the method comprising the steps of:

generating PoC box service information for providing a PoC box service;

sending, by the XDMC, a PoC box service information setting request message including the PoC box service information and storage request information for requesting storage of the PoC box service information to the PoC box service information storage server;

receiving, by the XDMC, a first response message including a PoC box service Identifier (ID) mapping the PoC box service information stored in the PoC box service information storage server, from the PoC box service information storage server;

processing a session connection with the PoC server; and sending a media data to be stored in the PoC box, through the PoC server, to the PoC box.

2. The method of claim 1, wherein the PoC box service information includes at least one parameter of a PoC box type for indicating whether a UE PoC box or a network PoC box is used, a type of media to be transmitted to the PoC box, a maximum storage size and time, a type of codec to be used when media is stored in the PoC box, an answer mode of the PoC box, a PoC box Identifier (ID), and a PoC box service related information to be used when a PoC box service activation request message has expired.

3. The method of claim 2, wherein the PoC box service information setting request message includes the PoC box service ID and the first response message includes information indicating whether the PoC box ID is available.

4. The method of claim 2, wherein the PoC box service information setting request message does not include the PoC box service ID and the first response message incudes the PoC box service ID generated by the PoC box service information storage server.

5. The method of claim 1, further comprising:

sending a PoC box service activation request message including a value of indicating whether the PoC box service is activated to the PoC server; and receiving a second response message in response to the PoC box service activation request message from the PoC server.

6. The method of claim 5, wherein the PoC box service activation request message comprises at least one of PoC UE address information and the PoC box service ID.

7. The method of claim 5, wherein the PoC box service information setting request message is sent to the PoC box service information storage server using an XML Configuration Access Protocol (XCAP).

8. The method of claim 1, wherein the PoC box service information setting request message is an XML document including the PoC box service information.

9. The method of claim 1, wherein the PoC box service information setting request message is a Hyper Text Transfer Protocol (HTTP) PUT message, and includes Uniform Resource Identifier (URI) information for setting the PoC box service information and setting up a session.

10. The method of claim 1, wherein the PoC box is comprised in at least one of a network and another PoC UE different from the PoC UE comprised in the PoC system.

11. A method for managing a Push-To-Talk (PTT) over Cellular (PoC) box service in a PoC server in a PoC system, wherein the PoC system comprises a PoC User Equipment (UE) including a PoC Extensible Markup Language (XML) Document Management Client (XDMC) and a PoC client, the PoC server, a PoC box service information storage server for storing PoC box service information, and a PoC box, the method comprising the steps of:

receiving a PoC box service activation request message from the PoC UE;

receiving a session request message from the PoC UE;

sending a PoC box service information request message for requesting the PoC box service information to the PoC box service information storage server for providing a PoC box service;

receiving the PoC box service information mapped to the PoC client from the PoC box service information storage server;

setting a session with the PoC box corresponding to the PoC box service information; and receiving media data to be stored in the PoC box and sending the media date-data to the PoC box based on the PoC box service information.

12. The method of claim 11, wherein the PoC box service activation request message includes a value indicating whether the PoC box service is activated.

13. The method of claim 11, wherein the PoC box service activation request message includes at least one of PoC UE address information and a PoC box service ID including information for mapping the PoC box service information stored in the PoC box service information storage server.

14. The method of claim 11, wherein the box service information request message comprises at least one of PoC UE address information and a PoC box service ID comprising information of mapping the PoC box service information stored in the PoC box service information storage server.

15. The method of claim 11, further comprising:
storing the PoC box service information received from the PoC box service information storage server into the PoC server.

16. A Push-To-Talk (PTT) over Cellular (PoC) User Equipment (UE) in a PoC system, the PoC UE comprising:

a PoC Extensible Markup Language (XML) Document Management Client (XDMC) for generating a PoC box service information for providing a PoC box service, sending a PoC box service information setting request message including the PoC box service information and storage request information for requesting storage of the PoC box service information to a PoC box service information storage server, and receiving a first response message including a PoC box service Identifier (ID) mapping the PoC box service information stored in the PoC box service information storage server, from the PoC box service information storage server; and a PoC client for processing a session connection with a PoC server and sending media data to be stored in a PoC box, through the PoC server, to the PoC box.

17. The PoC UE of claim 16, wherein the PoC client sends a PoC box service activation request message including a value indicating whether the PoC box service is activated to the PoC server, and receives a second response message in response to the PoC box service activation request message from the PoC server.

18. A Push-To-Talk (PTT) over Cellular (PoC) server in a PoC system, the PoC server including a processor for:

receiving a PoC box service activation request message from a PoC User Equipment(UE);

receiving a session request message from the PoC UE;

sending a PoC box service information request message for requesting PoC box service information to a PoC box service information storage server storing the PoC box service information for providing a PoC box service;

receiving the PoC box service information mapped to a PoC UE from the PoC box service information storage server;

setting a session with a PoC box corresponding to the PoC box service information; and receiving media data to be stored into the PoC box and sending the media data to the PoC box based on the PoC box service information.

19. The PoC server of claim 18, wherein the PoC box service activation request message includes at least one of PoC UE address information and a PoC box service ID including information for mapping the PoC box service information stored in the PoC box service information storage server.

20. A Push-To-Talk (PTT) over Cellular (PoC) box service information storage server for storing a PoC box service information in a PoC system, the PoC box service information storage server including a processor for:

receiving a PoC box service information setting request message comprising the PoC box service information and storage request information for requesting storage of the PoC box service information from a PoC Extensible Markup Language (XML) Document Management Client (XDMC) in a PoC User Equipment (UE);

storing the PoC box service information;

generating a PoC box service Identifier (ID) mapping the PoC box service information stored in the PoC box service information storage server;

sending a first response message comprising the PoC box service ID to the PoC UE;

receiving a PoC box service information request message for requesting PoC box service information from a PoC server; and determining the PoC box service information and sending the PoC box service information to the PoC server.

* * * * *